United States Patent
Sbaiz et al.

(10) Patent No.: US 9,971,940 B1
(45) Date of Patent: May 15, 2018

(54) AUTOMATIC LEARNING OF A VIDEO MATCHING SYSTEM

(71) Applicant: Google Inc., Mountain View, CA (US)

(72) Inventors: Luciano Sbaiz, Zürich (CH); Jay Yagnik, Mountain View, CA (US); King Hong Thomas Leung, Saratoga, CA (US); Hanna Pasula, Zürich (CH); Thomas Chadwick Walters, Bromley (GB); Thomas Bugnon, Zürich (CH); Matthias Rochus Konrad, Zürich (CH)

(73) Assignee: GOOGLE LLC, Mountain View, CA (US)

( * ) Notice: Subject to any disclaimer, the term of this patent is extended or adjusted under 35 U.S.C. 154(b) by 11 days.

(21) Appl. No.: 15/231,445

(22) Filed: Aug. 8, 2016

Related U.S. Application Data

(60) Provisional application No. 62/203,318, filed on Aug. 10, 2015.

(51) Int. Cl.
*G06K 9/62* (2006.01)
*G06K 9/00* (2006.01)
(Continued)

(52) U.S. Cl.
CPC ......... *G06K 9/00758* (2013.01); *G06F 21/32* (2013.01); *G06K 9/00718* (2013.01);
(Continued)

(58) Field of Classification Search
USPC ................. 382/128, 131, 156, 190; 704/205; 706/12, 45; 707/732, 748, 769; 709/206;
(Continued)

(56) References Cited

U.S. PATENT DOCUMENTS

| | | | |
|---|---|---|---|
| 8,121,362 B2 * | 2/2012 | Zhan | ........................ G06K 9/32 382/128 |
| 8,131,786 B1 * | 3/2012 | Bengio | ............. G06F 17/30244 707/732 |

(Continued)

OTHER PUBLICATIONS

Krizhevsky, A., et al., "ImageNet Classification with Deep Convolutional Neural Networks," Advances in neural information processing systems, 2012, 9 pages.

*Primary Examiner* — Xuemei Chen
(74) *Attorney, Agent, or Firm* — Young Basil Hanlon & MacFarlane, P.C.

(57) ABSTRACT

Provided content is determined to contain an asset represented by reference content by comparing digital fingerprints of the provided content and the reference content. The fingerprints of the reference content and the provided content are generated using a convolutional neural network (CNN). The CNN is trained using a plurality of frame triplets including an anchor frame representing the reference content, a positive frame which is a transformation of the anchor frame, and a negative frame representing content that is not the reference content. The provided content is determined to contain the asset represented by the reference content based on a similarity measure between the generated fingerprints. If the provided content is determined to contain the asset represented by the reference content, a policy associated with the asset is enforced on the provided content.

15 Claims, 7 Drawing Sheets

(51) Int. Cl.
*G06F 21/32* (2013.01)
*G06N 3/04* (2006.01)

(52) U.S. Cl.
CPC ....... *G06K 9/00765* (2013.01); *G06K 9/6215* (2013.01); *G06K 9/6255* (2013.01); *G06K 9/6269* (2013.01); *G06N 3/04* (2013.01)

(58) Field of Classification Search
USPC ..................................................... 725/9, 22
See application file for complete search history.

(56) References Cited

U.S. PATENT DOCUMENTS

| | | | | |
|---|---|---|---|---|
| 8,463,719 B2* | 6/2013 | Lyon | ....................... | G10L 25/48 706/12 |
| 8,612,455 B2* | 12/2013 | Sa'adon | ............ | G06F 17/30867 707/748 |
| 8,831,358 B1* | 9/2014 | Song | ....................... | G06K 9/623 382/190 |
| 8,924,993 B1* | 12/2014 | Niebles Duque | . | H04L 29/06462 725/9 |
| 8,990,134 B1* | 3/2015 | Snoek | ............... | G06F 17/30784 706/45 |
| 9,226,047 B2* | 12/2015 | Thorwirth | ......... | G06F 17/30038 |
| 9,390,315 B1* | 7/2016 | Yalniz | .................. | G06K 9/4609 |
| 9,424,493 B2* | 8/2016 | He | .................... | G06F 17/30247 |
| 9,619,521 B1* | 4/2017 | Sukthankar | .......... | G06N 99/005 |
| 2003/0236661 A1* | 12/2003 | Burges | ................. | G06K 9/4647 704/205 |
| 2007/0261075 A1* | 11/2007 | Glasberg | ............ | G06K 9/00711 725/22 |
| 2009/0074280 A1* | 3/2009 | Lu | ............................ | A61B 8/00 382/131 |
| 2013/0114902 A1* | 5/2013 | Sukthankar | ...... | H04N 21/23418 382/190 |
| 2013/0136322 A1* | 5/2013 | Zhan | ........................ | G06T 7/73 382/128 |
| 2013/0290222 A1* | 10/2013 | Gordo | ............... | G06F 17/30247 706/12 |
| 2014/0019390 A1* | 1/2014 | Glennon | ................. | G06N 5/02 706/12 |
| 2014/0222928 A1* | 8/2014 | Scholtes | ............... | H04L 51/046 709/206 |
| 2015/0100524 A1* | 4/2015 | Pantel | ................ | G06F 17/3053 706/12 |
| 2015/0278642 A1* | 10/2015 | Chertok | .................... | G06N 3/02 382/156 |
| 2016/0098844 A1* | 4/2016 | Shaji | ...................... | G06T 9/002 382/156 |
| 2016/0283975 A1* | 9/2016 | Kaul | .................. | G06Q 30/0248 |
| 2016/0378863 A1* | 12/2016 | Shlens | ..................... | G06N 3/02 707/769 |
| 2017/0243082 A1* | 8/2017 | Song | .................... | G06K 9/6215 |

* cited by examiner

US 9,971,940 B1

AUTOMATIC LEARNING OF A VIDEO MATCHING SYSTEM

CROSS-REFERENCE TO RELATED APPLICATION

This application claims the benefit of U.S. Provisional Application No. 62/203,318, filed Aug. 10, 2015, which is incorporated by reference herein.

BACKGROUND

1. Field of the Invention

This invention generally relates to management of online content. In particular, the invention relates to identifying online content that contains other known content.

2. Description of the Related Art

The proliferation of web sites that allow users to upload multimedia content for mass viewing has brought with it a number of challenges, not the least of which has been how to detect and handle uploaded content in which other entities have rights. Given the nature of user-generated content (UGC), e.g., content provided by users to a web site, automatically detecting content subject to the rights of others has proven to be a very difficult technical problem. For example, a user may provide a first video that includes copyrighted content from another source. The copyrighted content might be modified in a way that makes the content difficult for the web site to detect, e.g., cropped, or reversed. The web site must nevertheless identify the copyrighted content so the rights holder of the copyrighted content can take appropriate actions with respect to the content.

SUMMARY

The above and other issues are addressed by a method, a computer-readable medium, and system for identifying reference content within provided content. An embodiment of the method comprises receiving reference content representing an asset, and generating a reference fingerprint from the reference content using a convolutional neural network (CNN). The method also comprises receiving provided content that may contain the asset and generating a fingerprint from the provided content using the CNN. The method further comprises determining whether the provided content contains the asset represented by the reference content by comparing the fingerprint generated from the provided content with the reference fingerprint, and enforcing a policy associated with the asset on the provided content if the provided content is determined to contain the asset.

An embodiment of the medium includes a non-transitory computer-readable medium storing executable computer program instructions for identifying reference content within provided content. The computer program instructions comprise instructions for receiving reference content representing an asset, and generating a reference fingerprint from the reference content using a convolutional neural network (CNN). The instructions also comprise receiving provided content that may contain the asset and generating a fingerprint from the provided content using the CNN. The instructions further comprise determining whether the provided content contains the asset represented by the reference content by comparing the fingerprint generated from the provided content with the reference fingerprint, and enforcing a policy associated with the asset on the provided content if the provided content is determined to contain the asset.

An embodiment of the system comprises a non-transitory computer-readable storage medium storing executable computer program instructions and a processor for executing the instructions. The computer program instructions comprise instructions for receiving reference content representing an asset, and generating a reference fingerprint from the reference content using a convolutional neural network (CNN). The instructions also comprise receiving provided content that may contain the asset and generating a fingerprint from the provided content using the CNN. The instructions further comprise determining whether the provided content contains the asset represented by the reference content by comparing the fingerprint generated from the provided content with the reference fingerprint, and enforcing a policy associated with the asset on the provided content if the provided content is determined to contain the asset.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
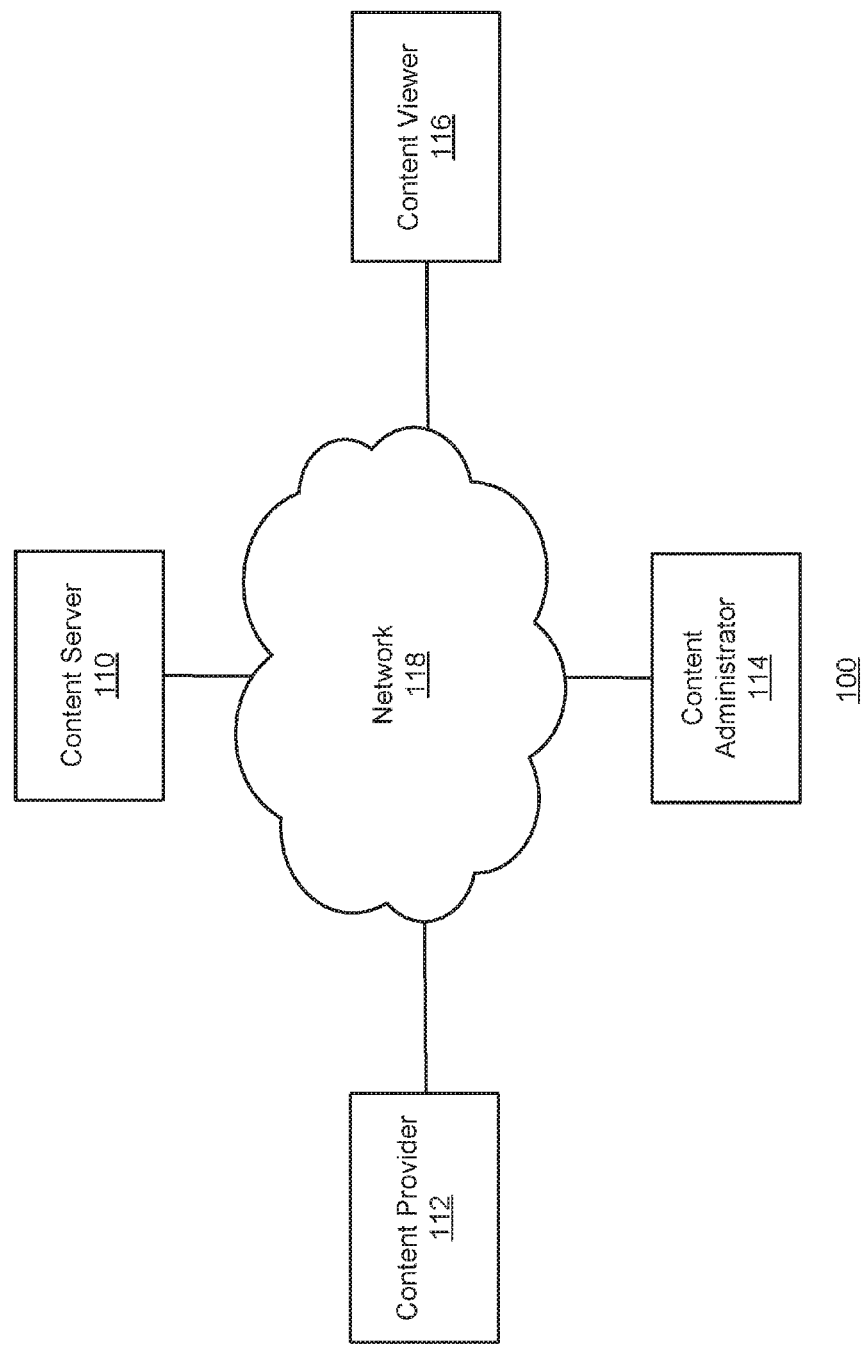
FIG. 1 is a block diagram of a computing environment having a rights management system according to one embodiment.

FIG. 1 is a block diagram of a computing environment 100 having a rights management system according to one embodiment. FIG. 1 illustrates a content server 110, a content provider 112, a content administrator 114, and a content viewer 116 connected by a network 118. For simplicity and clarity, the content provider 112, content administrator 114, and content viewer are respectively referred to as the "provider," "administrator," and "viewer" herein. Moreover, even though only single instances of these three entities are shown in FIG. 1, embodiments of the computing environment 100 can have thousands or millions of providers 112, administrators 114, and viewers 116. Embodiments can have multiple content servers 110 as well.

The content server 110 serves content provided by the providers 112 to viewers 116 via the network 118 according to policies specified by administrators 114. In one embodiment, the content includes video content and hence the consumer of the content is referred to as a "viewer" 116. The types of content can vary in different embodiments, and can include, for example, multimedia content such as movies, television programs, and music videos, audio content such as music, and textual content. The content server 110 includes a database storing the content and other data and a web server for interacting with the entities on the network 118.

The provider 112 is an entity that provides content to the content server 110 for serving to viewers 116. The provider 112 can be, for example, an individual user that generates a home movie and provides it to the content server 110 so that the movie can be viewed by the viewers 116. The individual may have no relationship with the content server 110, except perhaps an account at the content server 110. Content from such individuals is referred to as "user-generated content" ("UGC"). In contrast, the provider 112 can also be a partner of the content server 110, such as a production company or other content generator that has a commercial agreement to provide content to the content server 110. Content from partner providers is referred to as "provider-generated content") ("PGC"). In a typical embodiment, the content provider 112 uses a device such as a personal computer or mobile telephone executing a web browser such as GOOGLE CHROME to provide the content to the content server 110.

The content provided by the provider 112 can include one or more "assets," where an asset represents a piece of intellectual property (IP). For example, a video uploaded as UGC may include scenes from one or more movies from other sources. The scenes might be modified in an effort to avoid detection. For example, a scene might be flipped along the left/right axis, contain modified colors relative to the original scene, be cropped, or placed within another simultaneously displayed video.

These scenes each constitute a separate asset. As assets represent IP, an asset has a set of rights associated with it. These rights typically derive from copyright and may include, for example, reproduction rights, distribution rights, and public performance rights.

The administrator 114 manages rights for an asset by specifying a policy that the content server 110 applies to the asset. The administrator 114 can be the owner of one or more rights to an asset or another party acting on behalf of the rights owner. The administrator 114 makes a "claim" to content at the content server 110 that includes an asset administered by the administrator.

The policy specified by the administrator 114 includes a set of rules that specify actions the content server 110 performs on content claimed by the administrator. The actions can include, for example, blocking viewing of the content, tracking usage of the asset in the content, and monetizing the content by, e.g., displaying ads in association with the content. In a typical embodiment, the administrator 114 uses a computer executing a web browser to interact with the content server 110 to perform tasks such as identifying assets, claiming content, and specifying policies.

The administrator 114 may provide the content server with "reference content" contained in the asset so the content server 110 can identify content that contains the asset. The reference content can include a digital copy of the asset, such as an MPEG-2 file of a video. The content server 110 searches provided content and identifies a match with reference content if similarities are detected between the characteristics of the reference content and the provided content. The identification may include generating digital fingerprints of the reference content and comparing these reference fingerprints to fingerprints generated from the provided content. If the compared fingerprints match, the provided content includes the reference content associated with the reference fingerprint.

The viewer 116 represents a consumer of the content served by the content server 110. The viewer 116 is typically a user using a web browser or dedicated application executing on a personal computer, mobile telephone, or television set-top box to interact with the content server 110 to view content provided by the content server 110. Depending upon the embodiment, the viewer 116 can receive the content as streaming media, as a download, or in another format. The viewer 116 may view the content, e.g., while accessing a web site provided by the content server 110 or while accessing a web site provided by a third party that serves content from the content server 110 via an embedded link or equivalent technique.

The network 118 enables communications among the entities connected to it. In one embodiment, the network 118 is the Internet and uses standard communications technologies and/or protocols. Thus, the network 118 can include links using technologies such as Ethernet, 802.11, world-wide interoperability for microwave access (WiMAX), 3G, digital subscriber line (DSL), asynchronous transfer mode (ATM), InfiniBand, PCI Express Advanced Switching, etc. Similarly, the networking protocols used on the network 118 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 118 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

The computing environment 100 thus provides a flexible rights management system where the content server 110 can serve both UGC and PGC while handling the content in accordance with the wishes of the administrators 114 of the content.

Figure 2:
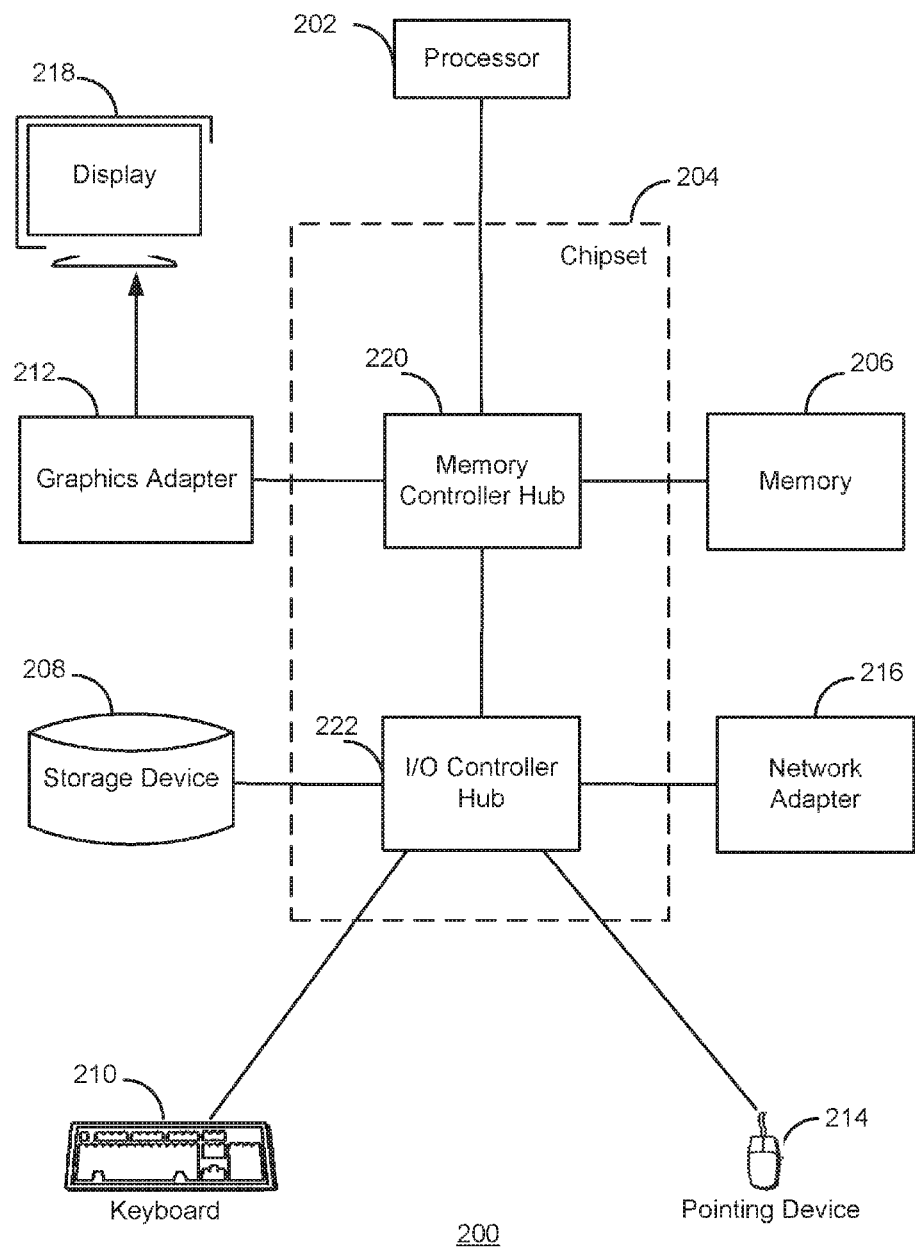
FIG. 2 is a block diagram illustrating an example of a computer for use as a content server or for use by a provider, administrator, or viewer.

FIG. 2 is a block diagram illustrating an example of a computer 200 for use as a content server 110 or for use by a provider 112, administrator 114, or viewer 116. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer 200. The graphics adapter 212 displays images and other information on the display device 218. The network adapter 216 couples the computer system 200 to the network 118. Some embodiments of the computer 200 have different and/or other components than those shown in FIG. 2.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

The types of computers 200 used by the entities of FIG. 1 can vary depending upon the embodiment and the processing power used by the entity. For example, a mobile telephone used by a provider 112 to send content to the content server 110 typically has limited processing power, a small display 218, and might lack a pointing device 214. The content server 110, in contrast, may comprise multiple blade servers working together to provide the functionality described herein.

Figure 3:
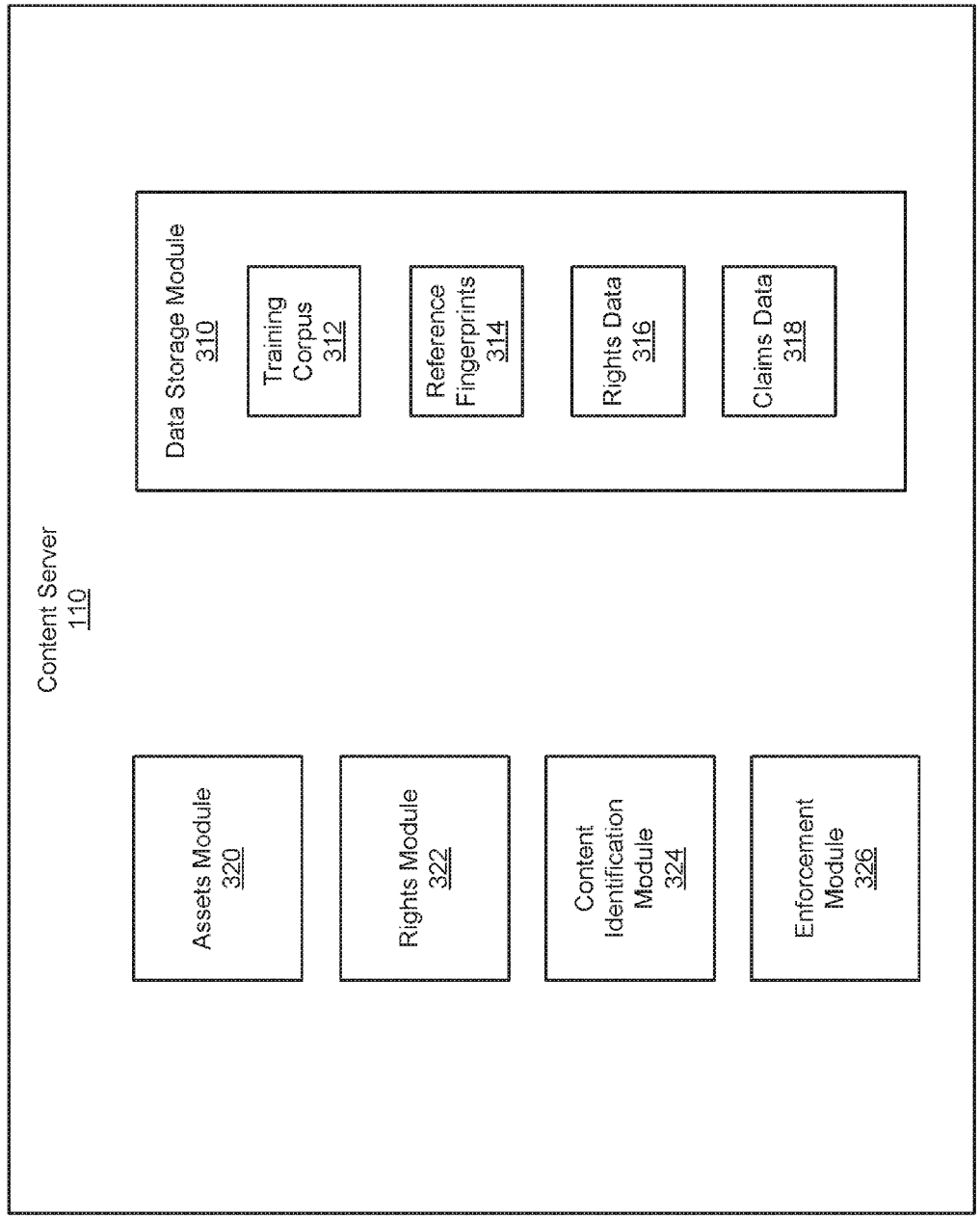
FIG. 3 is a block diagram illustrating modules within the content server according to one embodiment.

FIG. 3 is a block diagram illustrating modules within the content server 110 according to one embodiment. Some embodiments of the content server 110 have different and/or additional modules than the ones described here. Similarly, the functions can be distributed among the modules in a different manner than is described here. Certain modules and functions can be incorporated into other modules of the content server 110 and/or other entities on the network 118.

A data storage module 310 stores data used by the various modules of the content server 110. The data storage module 310 can be implemented by one or more database systems.

The stored data include a training corpus 312 that contains a collection of reference content. In one embodiment, the reference content in the training corpus 312 is a subset of the reference content provided by the administrators.

The stored data also include reference fingerprint data 314 that contain fingerprints of the reference content provided by the administrators 114. For example, the reference fingerprint data 314 may include a database that stores multiple reference fingerprints from a large amount of different reference content. A "fingerprint" is a compact digital representation of digital content. For example, a fingerprint for a frame of a video is a compact representation of the video content within the frame. A fingerprint is unique in the sense that different pieces of video content have different fingerprints. Hence, two pieces of digital content are identical if the pieces have identical fingerprints.

The stored data further include rights data 316 describing policies specified by administrators, and claims data 318 describing claims made by administrators. As mentioned above, the policies can indicate to perform one or more actions on content claimed by an administrator. The actions may include blocking viewing of the content, tracking usage of the asset in the content, and monetizing the content by, e.g., displaying ads in association with the content.

An assets module 320 provides functionality allowing administrators 114 to describe assets that can be contained in content stored by the content server 110. One embodiment of the content server 110 recognizes asset types including music videos, sound recordings, compositions, movies, television programs and web videos. The administrators 114 may use the assets module 320 to upload reference content contained in the asset to the content server 110.

A rights module 322 provides functionality allowing administrators 114 to specify rights designations including policies that the content server 110 applies to assets 410. In one embodiment, the rights module 322 provides a user interface allowing administrators to indicate particular policies to apply to particular content.

A content identification module 324 identifies whether provided content contains reference content. Generally, the identification module 324 generates fingerprints representing the provided content and determines whether these fingerprints match stored reference fingerprints 314. The content identification module 324 may determine that a match occurs if the two fingerprints being compared have more than a threshold level of similarity. If the fingerprints match, the content identification module 324 determines that the provided content includes the reference content associated with the matching reference fingerprints.

An enforcement module 326 enforces policy-specified actions on claimed content. Specifically, if the content identification module 324 determines that provided content includes reference content, the enforcement module 326 claims the provided content on behalf of the content administrator associated with the reference content (i.e., the administrator of the asset represented by the reference content). The enforcement module 326 applies the rights policy specified by the administrator for the asset to the provided content.

Figure 4:
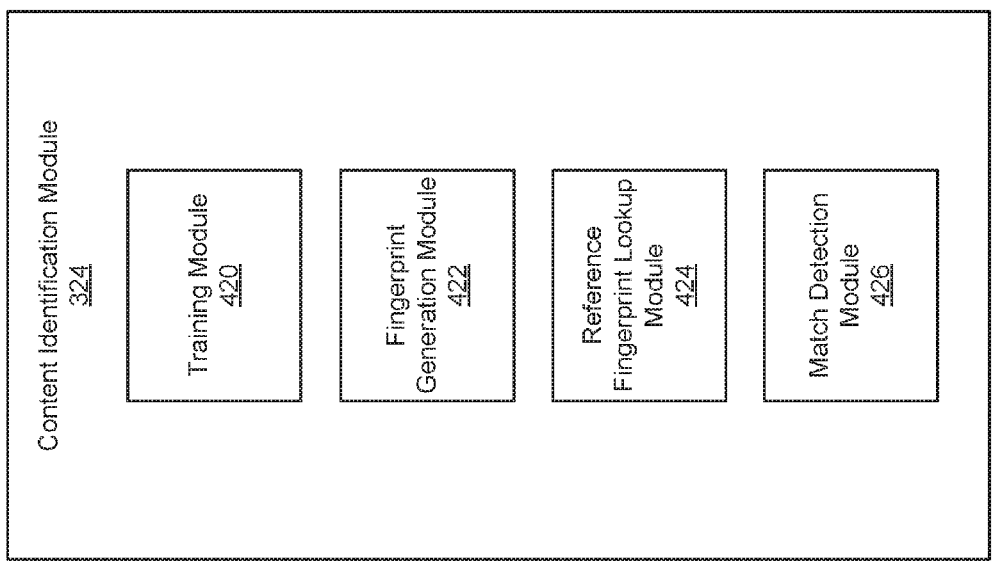
FIG. 4 is a block diagram illustrating the content identification module implemented by the content server according to one embodiment.

FIG. 4 is a block diagram illustrating the content identification module 324 according to one embodiment. Some embodiments of the content identification module 324 have different and/or additional modules than the ones described here. Similarly, the functions can be distributed among the modules in a different manner than is described here. Certain modules and functions can be incorporated into other modules of the content identification module 324 and/or other entities on the network 118.

Although the following example embodiment is described primarily with reference to video content, the same principles and operations can be applied to other content such as audio content or textual content.

The training module 420 of the content identification module 324 trains one or more neural networks to output fingerprints. In one embodiment, the training module 420 uses image data, such as frames of reference content and transformations of the reference frames to train the neural networks. The neural networks are trained to cause the output of a neural network generated based on a reference frame to match the output of a neural network generated based on a transformation of the reference frame. These outputs serve as fingerprints of the inputs.

The fingerprint generation module 422 generates fingerprints of reference content provided by administrators 114 in the assets module 320 and fingerprints of provided content. The fingerprints are generated by inputting image data of frames of reference content and image data of frames of provided content into a trained neural network. The fingerprint generation module 422 stores the outputs of the neural network for the reference content as the reference fingerprint data 314 of the data storage module 310.

In one embodiment, the fingerprint generation module 422 generates fingerprints for every frame of reference content and/or provided content. In another embodiment, the fingerprint generation module 422 generates fingerprints for only selected frames, such as for one frame selected from the content according to a predetermining interval (e.g., every ¼ of a second). In addition, embodiments can use variations of these techniques, such as generating fingerprints for every frame of reference material and for only selected frames of provided content.

The reference fingerprint lookup module 424 compares fingerprints of generated content with fingerprints of reference content to determine whether the fingerprints match. In one embodiment, the reference fingerprint lookup module 424 receives a fingerprint of provided content from the fingerprint generation module 422 and determines whether the fingerprint matches a reference fingerprint in the reference fingerprint data 314. The matching can be accomplished by performing a lookup on the reference fingerprint data 314 to determine whether it contains any reference fingerprints that match the fingerprint of the provided content. Dependent upon the embodiment, the lookup can be performed using a hash table, a tree-based lookup, or another method. In one embodiment, two fingerprints must be identical for the fingerprints to be considered matching. In another embodiment, the fingerprints are considered as matching if they have at least a threshold level of similarity.

The match detection module 426 uses the results of the comparisons performed by the reference fingerprint lookup module 424 to determine whether provided content includes reference content. In one embodiment, the match detection module 426 determines that provided content includes reference content if a single fingerprint generated from the provided content matches a reference fingerprint. In another embodiment, the match detection module 426 determines that provided content includes reference content if more than a threshold number of fingerprints from the provided content match reference fingerprints associated with the same reference content. In yet another embodiment, the match detection module 426 determines that provided content includes reference content if a sequence of fingerprints from the provided content match fingerprints of the reference content. For example, if five or more fingerprints consecutively generated from the provided content match fingerprints associated with the same reference content, the match detection module 426 declares that a match is detected and that the provided content matches the reference content.

Figure 5:
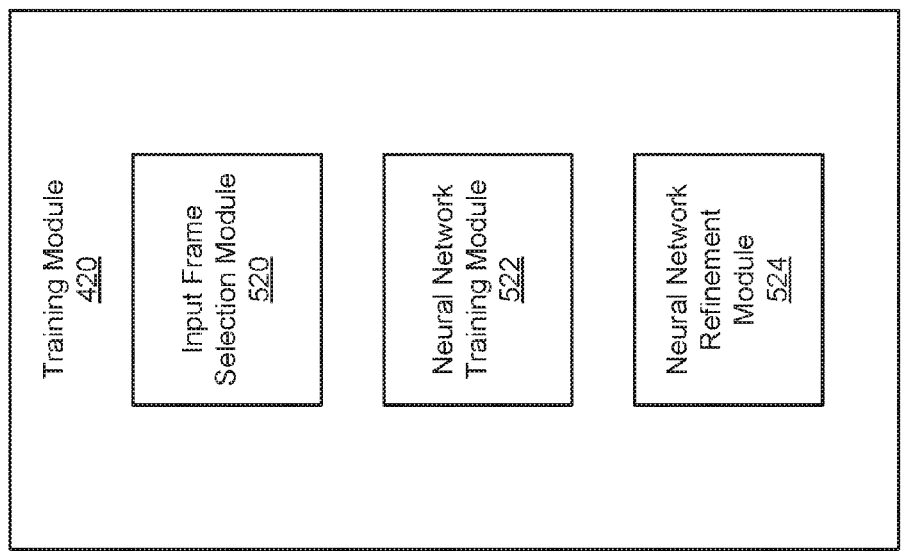
FIG. 5 is a block diagram illustrating the training module implemented by the content identification module according to one embodiment.

FIG. 5 is a block diagram illustrating the training module 420 according to one embodiment. As mentioned above, the training module 420 trains one or more neural networks to output fingerprints. In one embodiment, the training module 420 trains three neural networks as described below. Other embodiments of the training module 420 train a different number of neural networks. In addition, some embodiments of the training module 420 have different and/or additional modules than the ones described here. Similarly, the functions can be distributed among the modules in a different manner than is described here. Certain modules and functions can be incorporated into other modules of the training module 420 and/or other entities on the network 118.

The input frame selection module 520 selects frames of video content to use as training data for the neural networks. In one embodiment, the input frame selection module 520 selects the frames from among the reference content in the training corpus 312. For example, the input frame selection module 520 may initially select a subset of the discrete pieces of reference content in the training corpus 312, and then select a subset of frames from each piece of selected reference content to use as training data. To select the frames, an embodiment of the input frame selection module 520 separates a given piece of reference content into a set of scenes, and then selects one frame from each scene.

In one embodiment, the input frame selection module 520 selects triplets of three related frames as training data. The three neural networks are trained using a succession of such triplets, with each of the neural networks receiving and training on a single frame from each triplet. For example, the neural networks may be trained using a separate triplet from each scene of each piece of selected reference content. The neural networks are thus trained using a large number of triplets.

The frames in a triplet are referred to as an "anchor frame," a "positive frame" and a "negative frame." In one embodiment, the anchor frame is a frame from reference content, the positive frame is a positive example of the reference content, and the negative frame resembles content that is not the reference content. Since the anchor frame is a frame extracted from reference content, the anchor frame represents the original reference content. The positive frame, in contrast, represents a positive example of the reference content included in provided content. In one embodiment, the positive frame is produced by applying one or more transformations to the anchor frame. These transformations may be performed by the input frame selection module 520 or by another module and mimic the modifications a provider might make to the reference content when including it in provided content in order to obfuscate the source of the provided content. The negative frame, on the other hand, represents an example of content that is not the reference content. In one embodiment, the input frame selection module 520 selects the negative frame from a different scene of the same piece of reference content from which the anchor frame was selected. The negative frame therefore is likely to resemble the anchor frame in many respects even though it is different.

In another embodiment, the positive frame is a frame from reference content, the anchor frame is a transformation of the positive frame, and the negative frame represents content that is not the reference content that undergoes the same type of transformation as the anchor frame. For example, when the anchor frame is generated by translating the positive frame into a greyscale frame, the negative frame may be generated by selecting a frame from a different scene of the same piece of reference content from which the positive frame was selected, and also translating this frame into a greyscale frame.

The neural network training module 522 takes the training data generated from the input frame selection module 520 (e.g., the frame triplets) and trains three identical neural networks. One neural network receives the anchor frame image data as input ("anchor frame neural network"), one receives the positive frame image data as input ("positive frame neural network") and one receives the negative frame image data as input ("negative frame neural network"). Each of the neural networks are pre-determined to have k layers with $m^l$ nodes for each layer l=1, 2, . . . , k, including the input layer and the output layer. Connections may be made between a node at layer l and a node at layer l+1 with a weight associated with each connection. An intermediate value at a node in layer l+1 is calculated by a weighted combination of the values in the nodes that it is connected to in the previous layer l. The weights on the connections are represented by a series of weight matrices $W^{l \rightarrow l+1}$ from layer l to layer l+1, l=1, 2, . . . , k−1, and are subject to change through the training process of the neural networks. The intermediate values in layer l+1 are found by multiplying the values of nodes in layer l with the weight matrix $W^{l \rightarrow l+1}$. The final value is given by applying a transfer function $g^{l+1}$ (•) for layer l+1 to the intermediate value.

Given an input, the output of a neural network is the input propagated through the neural network using the values of weight matrices $W^{l \rightarrow l+1}$ at that point in time. The neural network training module 522 updates weight matrices $W^{l \rightarrow l+1}$ of the three identical neural networks to minimize a loss function L(•). The loss function is a function of the outputs of the neural networks and, thus, depends on the weight matrices $W^{l \rightarrow l+1}$, but can also depend on other parameters θ of the network. In one embodiment, the output layer of the neural network contains 128 nodes or is represented by a vector with 128 values.

In one embodiment, the neural networks may be convolutional neural networks. The convolutional neural networks may have multiple convolutional layers and downsampling layers. The downsampling layers may include max-pooling layers. The nodes in the convolutional layers are convolutions of rectangular sections of the previous layer with respect to a rectangular image filter. The nodes in the max-pooling layers are maximum values of each convolution. The max-pooling layers provide local position invariance when extracting features from an image. In one embodiment, the last two layers of the convolutional neural networks may be fully-connected layers, where each node in a layer is connected to every node in the previous layer.

For training data containing n triplet instances, $a_i$, $p_i$, $n_i$, denotes the input vectors to the anchor frame neural network, positive frame neural network and negative frame neural network, respectively, for training instance i. The input vectors are a representation of the image data of the anchor frame, positive frame and negative frame. Similarly, we denote $f(a_i)$, $f(p_i)$, $f(n_i)$ as the output vectors to the anchor frame neural network, positive frame neural network and negative frame neural network, respectively, for training instance i.

In embodiment, the loss function of the neural networks is given by:

$$L(a, p, n, W^{1 \rightarrow 2}, \ldots, W^{k-1 \rightarrow k}; \theta) = \sum_{i=1}^{n} \max(0, c_1 \|f(a_i) - f(p_i)\|^2 - c_2 \|f(a_i) - f(n_i)\|^2 + \varepsilon)$$

where $c_1$ and $c_2$ are scaling constants and ε represents any additional terms, such as a constant or a function of the output vectors. For each training instance i in the summation, a maximum value is chosen between 0 and a function of the differences between the outputs of the anchor frame neural network, positive frame neural network, and negative frame neural network. Minimizing the given loss function is a combination of decreasing the summed difference between the output of the anchor frame neural network $f(a_i)$ and the output of the positive frame neural network $f(p_i)$, but increasing the summed difference between the output of the anchor frame neural network $f(a_i)$ and the output of the negative frame neural network $f(n_i)$. The difference is measured with a norm function, but can be measured by any function that quantifies the distances between two strings or vectors. In one embodiment, the Euclidean norm is used to measure the difference between two neural network output vectors.

The back propagation method for neural networks is used to find a series of weights $W^{l \rightarrow l+1}$, l=1, 2, ..., k−1, that minimize the loss function. The gradient of the loss function with respect to each weight matrix $W^{l \rightarrow l+1}$ is calculated and a gradient descent optimization method is used to update each weight matrix $W^{l \rightarrow l+1}$ in each iteration of the back propagation method. The output of the neural networks is re-calculated using the updated weight matrices, and the process is repeated until convergence is reached or a threshold criterion is satisfied for the values of the weight matrices. In one embodiment, the gradient descent optimization method may be stochastic gradient descent.

The fingerprint of an image frame is the output vector generated by the trained neural network given the input vector of the image frame. That is, the input vector of the image frame is propagated through the trained neural network using the values of the trained weight matrices $W^{l \rightarrow l+1}$. Thus, the fingerprint of an image frame is a characteristic feature vector describing the image frame. In one embodiment, the fingerprint contains 128 features or 128 different values, where each value characterizes a given feature of the input frame.

The neural networks are trained so the fingerprint of a positive frame is similar to the fingerprint of the corresponding anchor frame. This allows the content identification module 324 to identify provided content that matches reference content. In other words, the probability of not detecting reference content within provided content is minimized. On the other hand, the neural networks generate a fingerprint that is dissimilar to the fingerprint of the anchor frame from a negative frame that is different than but similar to the anchor frame. In other words, the probability of falsely detecting reference content within provided content is minimized. Especially, when the neural networks are trained with anchor frames and negative frames that have undergone the same transformation, the generated fingerprints are able to distinguish the anchor frame from the negative frame independent of various frame transformations and solely based on the content of the frames.

The neural network refinement module 524 refines the training performed by the neural network training module 522 to improve the fingerprint generation capabilities of the neural networks. As mentioned above, the neural network training module 522 trains the neural network using a succession of frame triplets. The neural network refinement module 524 stores the output fingerprints (i.e., $f(a_i)$, $f(p_i)$, $f(n_i)$) for each triplet. In addition, for every batch of n (e.g., n=2000) triplets, the neural network refinement module 524 selects a new negative frame for each anchor frame, positive frame pair in the batch, thus forming a refined triplet. The new negative frame is selected from every other frame in the batch except for the frames of the anchor frame, positive frame pair for which the new negative frame is being selected. In one embodiment, the neural network refinement module 524 selects another frame in the batch having a fingerprint closest to (i.e., most similar to) the fingerprint of the anchor frame in the pair as the new negative frame. The neural network refinement module 520 uses the neural network training module 522 to train the neural networks using the refined triplets.

Figure 6:
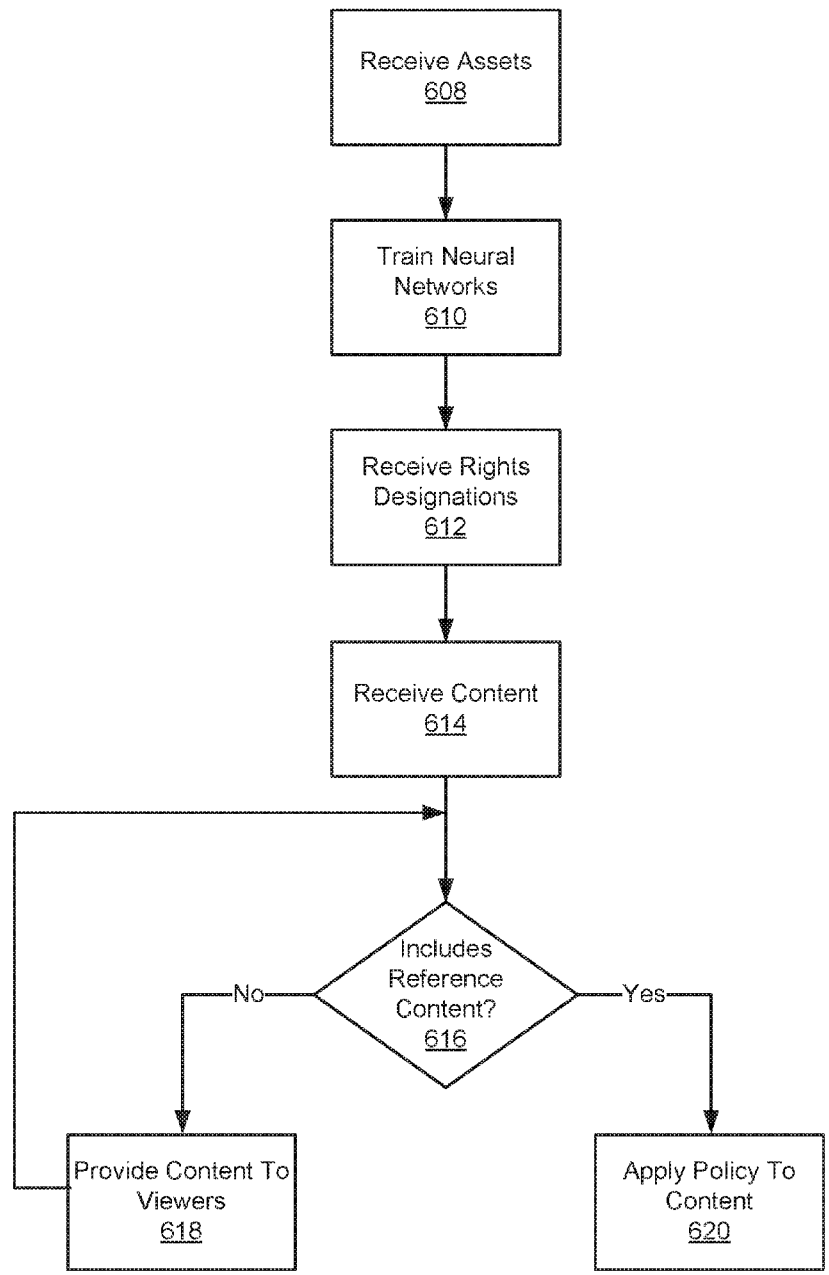
FIG. 6 is a flowchart illustrating a content-claiming process performed by the content server according to one embodiment.

FIG. 6 is a flowchart illustrating a content-claiming process performed by the content server 110 according to one embodiment. Other embodiments can have different and/or additional steps than the ones shown in FIG. 6.

The content server 110 receives 608 assets from administrators 114. The assets include, among other things, reference content that can be used to identify the assets. The content server 110 trains 610 neural networks using the training corpus 312. The training corpus 312 may include reference content received from administrators 114 and/or other content. The content server 110 generates fingerprints of the reference content using the trained neural networks and stores the fingerprints as reference fingerprints 314. The content server 110 also receives 612 rights designations for the assets. The rights designations specify policies applicable to the assets. Further, the content server 110 receives 614 content from content providers. The content can include UGC, such as content provided by individuals, and PGC, such as content received from production companies.

The content server 110 determines 616 whether the received content contains reference content. This determination 616 involves generating fingerprints of the received content using one or more of the trained neural networks and comparing the fingerprints of the received content with the reference fingerprints. If fingerprints of the received content match the reference fingerprints, the content server 110 determines 616 that the received content includes the reference content. Accordingly, the content server 110 applies 620 the policy associated with the reference content to the received content. Such a policy may, e.g., block or monetize the received content. If fingerprints of the received content do not match the reference fingerprints, the content server 110 provides 618 the received content to viewers. In addition, the content server 110 periodically checks to determine 616 whether the content is claimed in the future.

Figure 7:
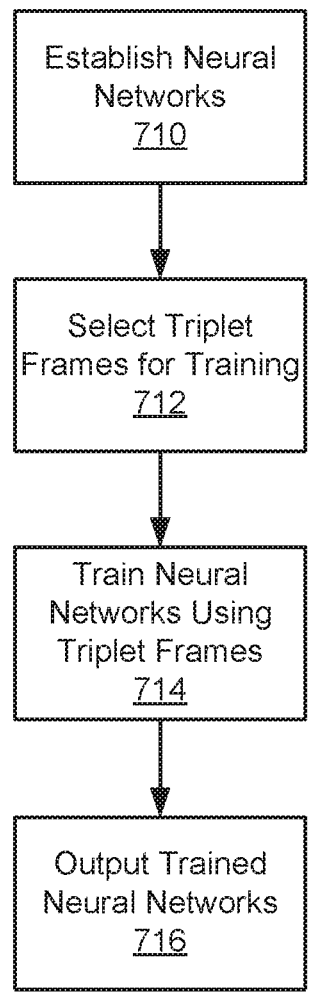
FIG. 7 is a flowchart illustrating the process of training neural networks for the content identification module according to one embodiment.

FIG. 7 is a flowchart illustrating the process of training neural networks for the content identification module 324 according to one embodiment. Other embodiments can have different and/or additional steps than the ones shown in FIG. 7. Initially, the three neural networks are established 710. Triplet frames are selected 712 for training the neural networks. Each triplet frame instance contains an anchor frame, a positive frame and a negative frame. The neural networks are trained 714 using the triplet frames. The trained neural networks are output 716 and may be used to identify provided content containing reference content.

The above description is included to illustrate the operation of the embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method for identifying reference content within provided content, comprising:
   training a convolutional neural network (CNN) to generate fingerprints using triplets of frames selected from a set of training content, wherein each of the triplets of frames includes an anchor frame, a positive frame, and a negative frame, wherein a fingerprint generated for an anchor frame of one of the triplets of frames is similar to a fingerprint generated for a positive frame of the one of the triplets of frames and dissimilar to a fingerprint generated for a negative frame of the one of the triplets of frames, wherein the negative frame of the one of the triplets of frames is selected from a first scene of the set of training content and the anchor frame of the one of the triplets of frames is selected from a second scene of the set of training content, wherein one of the fingerprints generated by training the CNN is a reference fingerprint generated from reference content representing an asset;
   subsequent to training the CNN, receiving provided content that may contain the asset;
   generating a fingerprint from the provided content using the CNN;
   determining whether the provided content contains the asset represented by the reference content by comparing the fingerprint generated from the provided content with the reference fingerprint; and
   responsive to determining that the provided content contains the asset, enforcing a policy associated with the asset on the provided content.

2. The method of claim 1, wherein the anchor frame of the one of the triplets of frames represents a frame including the reference content, the positive frame of the one of the triplets of frames represents a frame generated by applying a transformation to the anchor frame, and the negative frame of the one of the triplets of frames represents a frame including content that is not the reference content.

3. The method of claim 2, wherein the one of the triplets of frames is an identified triplet, the computer-implemented method further comprising:
   selecting a new negative frame for the identified triplet from among other ones of the triplets of frames; and
   replacing the negative frame of the identified triplet with the selected new negative frame to form a refined triplet,
   wherein training the CNN includes using the refined triplet.

4. The method of claim 3, wherein selecting a new negative frame for an identified triplet comprises:
   determining similarities between fingerprints for frames of the other ones of the triplets of frames and the fingerprint of the anchor frame for the identified triplet; and
   selecting the new negative frame for the identified triplet based on the determined similarities.

5. The method of claim 1, wherein the positive frame of the one of the triplets of frames represents a frame including the reference content, the anchor frame of the one of the triplets of frames represents a frame generated by applying a transformation to the positive frame, and the negative frame of the one of the triplets of frames represents a frame generated by applying the transformation of the anchor frame to a frame representing content that is not the reference content.

6. The method of claim 1, wherein determining whether the provided content contains the asset represented by the reference content comprises:
   comparing the fingerprint generated from the provided content with a plurality of fingerprints generated from a plurality of reference content; and
   determining that the provided content contains the asset responsive to the comparison indicating at least a threshold measure of similarity between the fingerprint generated from the provided content and a fingerprint of the plurality of fingerprints generated from the reference content representing the asset.

7. A non-transitory computer-readable storage medium storing executable computer program instructions for identifying reference content within provided content, the computer program instructions comprising:
   training a convolutional neural network (CNN) to generate fingerprints using triplets of frames selected from a set of training content, wherein each of the triplets of frames includes an anchor frame, a positive frame, and a negative frame, wherein a fingerprint generated for an anchor frame of one of the triplets of frames is similar to a fingerprint generated for a positive frame of the one of the triplets of frames and dissimilar to a fingerprint generated for a negative frame of the one of the triplets of frames, wherein the negative frame of the one of the triplets of frames is selected from a first scene of the set of training content and the anchor frame of the one of the triplets of frames is selected from a second scene of the set of training content, wherein one of the fingerprints generated by training the CNN is a reference fingerprint generated from reference content representing an asset;

subsequent to training the CNN, receiving provided content that may contain the asset;

generating a fingerprint from the provided content using the CNN;

determining whether the provided content contains the asset represented by the reference content by comparing the fingerprint generated from the provided content with the reference fingerprint; and responsive to determining that the provided content contains the asset, enforcing a policy associated with the asset on the provided content.

8. The computer-readable storage medium of claim 7, wherein the anchor frame of the one of the triplets of frames represents a frame including the reference content, the positive frame of the one of the triplets of frames represents a frame generated by applying a transformation to the anchor frame, and the negative frame of the one of the triplets of frames represents a frame including content that is not the reference content.

9. The computer-readable storage medium of claim 8, wherein the one of the triplets of frames is an identified triplet, the computer program instructions further comprising:

selecting a new negative frame for the identified triplet from among other ones of the triplets of frames; and replacing the negative frame of the identified triplet with the selected new negative frame to form a refined triplet, wherein training the CNN includes using the refined triplet.

10. The computer-readable storage medium of claim 9, wherein selecting a new negative frame for an identified triplet comprises:

determining similarities between fingerprints for frames of the other ones of the triplets of frames and the fingerprint of the anchor frame for the identified triplet; and selecting the new negative frame for the identified triplet based on the determined similarities.

11. The computer-readable storage medium of claim 7, wherein determining whether the provided content contains the asset represented by the reference content comprises:

comparing the fingerprint generated from the provided content with a plurality of fingerprints generated from a plurality of reference content; and determining that the provided content contains the asset responsive to the comparison indicating at least a threshold measure of similarity between the fingerprint generated from the provided content and a fingerprint of the plurality of fingerprints generated from the reference content representing the asset.

12. A system for identifying reference content within provided content, comprising:

a processor for generating computer program instructions; and a non-transitory computer-readable storage medium storing computer program instructions executable to perform steps comprising:

training a convolutional neural network (CNN) to generate fingerprints using triplets of frames selected from a set of training content, wherein each of the triplets of frames includes an anchor frame, a positive frame, and a negative frame, wherein a fingerprint generated for an anchor frame of one of the triplets of frames is similar to a fingerprint generated for a positive frame of the one of the triplets of frames and dissimilar to a fingerprint generated for a negative frame of the one of the triplets of frames, wherein the negative frame of the one of the triplets of frames is selected from a first scene of the set of training content and the anchor frame of the one of the triplets of frames is selected from a second scene of the set of training content, wherein one of the fingerprints generated by training the CNN is a reference fingerprint generated from reference content representing an asset;

subsequent to training the CNN, receiving provided content that may contain the asset;

generating a fingerprint from the provided content using the CNN;

determining whether the provided content contains the asset represented by the reference content by comparing the fingerprint generated from the provided content with the reference fingerprint; and responsive to determining that the provided content contains the asset, enforcing a policy associated with the asset on the provided content.

13. The system of claim 12, wherein the anchor frame of the one of the triplets of frames represents a frame including the reference content, the positive frame of the one of the triplets of frames represents a frame generated by applying a transformation to the anchor frame, and the negative frame of the one of the triplets of frames represents a frame including content that is not the reference content.

14. The system of claim 13, wherein the one of the triplets of frames is an identified triplet, the computer program instructions further comprising:

selecting a new negative frame for the identified triplet from other ones of the triplets of frames; and replacing the negative frame of the identified triplet with the selected new negative frame to form a refined triplet, wherein training the CNN includes using the refined triplet.

15. The system of claim 14, wherein selecting a new negative frame for an identified triplet comprises:

determining similarities between fingerprints for frames of the other ones of the triplets of frames and the fingerprint of the anchor frame for the identified triplet; and selecting the new negative frame for the identified triplet based on the determined similarities.

* * * * *